United States Patent
Omura et al.

(10) Patent No.: US 8,393,772 B2
(45) Date of Patent: Mar. 12, 2013

(54) VEHICLE LAMP

(75) Inventors: Junji Omura, Shizuoka (JP); Akira Watanabe, Shizuoka (JP); Toshimasa Ikeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 419 days.

(21) Appl. No.: 12/840,556

(22) Filed: Jul. 21, 2010

(65) Prior Publication Data
US 2011/0026268 A1    Feb. 3, 2011

(30) Foreign Application Priority Data
Jul. 28, 2009    (JP) .................................. 2009-175159

(51) Int. Cl.
*B60Q 1/00*    (2006.01)

(52) U.S. Cl. .......................... 362/548; 362/546; 362/375

(58) Field of Classification Search .................. 362/546, 362/548, 549, 362, 363, 375
See application file for complete search history.

(56) References Cited

U.S. PATENT DOCUMENTS
7,036,968 B2 *    5/2006    Michiba ........................ 362/520

FOREIGN PATENT DOCUMENTS
JP    10-247403 A    9/1998

* cited by examiner

*Primary Examiner* — Vip Patel
(74) *Attorney, Agent, or Firm* — Sughrue Mion, PLLC

(57) ABSTRACT

A vehicle lamp includes a lamp body having an opening, a resin cover attached to the opening to form a lamp chamber together with the lamp body; and a light source disposed inside the lamp chamber to irradiate light through the resin cover. The resin cover includes a design surface portion, and a peripheral edge portion surrounding the design surface portion. The peripheral edge portion includes a gate mark, and a thick-walled portion having a greater wall thickness than the other part of the peripheral edge portion and extending from the gate mark toward the design surface portion.

8 Claims, 4 Drawing Sheets

LATERAL WIDTH DIRECTION

LATERAL WIDTH DIRECTION
(VEHICLE WIDTH DIRECTION)

VEHICLE LAMP

CROSS-REFERENCE TO RELATED APPLICATIONS

The present application claims priority from Japanese Patent Application No. 2009-175159 filed on Jul. 28, 2009, the entire content of which is incorporated herein by reference.

FIELD OF THE INVENTION

The present invention relates to a vehicle lamp, and more particularly, to a vehicle lamp that includes a light source in a lamp chamber formed by a lamp body having a front opening and a resin cover attached to the front opening.

DESCRIPTION OF RELATED ART

In recent years, there have been increasing vehicle lamps having various shapes where size of front openings of lamp bodies of vehicle lamps to be mounted on a vehicle is increased and large transparent resin covers extend into side surfaces of the vehicle.

On the other hand, a vehicle lamp is required to have small weight for the purpose of reduction in driving load of a vehicle, and there is a demand for a reduction in thickness of, particularly, a resin cover or a lamp body which occupy a high component a ratio in terms of weight.

In general, such a resin cover is integrally molded with a polycarbonate (PC) resin or the like that has high impact strength, as well as excellent heat resistance. However, flowability of a polycarbonate resin is not good. Thus, when injection molding the polycarbonate resin in a cavity of a mold having a normal side gate, injection pressure loss increases at the side gate. Accordingly, it was unsuitable for a large and thin resin cover.

On the other hand, a related art vehicle lamp can suppress occurrence of molding defects, such as sink marks or filling insufficiency, when injection molding a large lamp body (see, e.g., JP 10-247403 A).

On a wall surface of such a lamp body, a gate print (a gate mark) and a rib extending from the gate print along the wall surface by a given length are formed during the injection molding. That is, a portion, which forms the rib, of a mold used to mold the lamp body functions as a runner for molten resin, so that the molten resin easily runs into every corner in the cavity. This enables a molding of a thin lamp body without generating molding defects.

Meanwhile, since the lamp body is concealed by a lamp unit component such as a reflector, the rib formed so as to be raised along the inner side of the wall surface does not affect the design when seen from the outside the lamp chamber. Of course, also when the rib is formed along the outer side of the wall surface, the wall surface of the lamp body mounted on a vehicle body does not affect the design when seen from the outside.

However, in a case in which a wall surface portion, along which the rib extending from the gate print by a given length is formed, is a design surface portion of the transparent resin cover, it affects external appearance of the design regardless of whether it is on the inner side or outer side of the wall surface. For this reason, such a rib cannot be formed on the wall surface of the resin cover.

Therefore, the related art molding method is unsuitable for a large and thin resin cover.

BRIEF SUMMARY

Illustrative aspects of the present invention provide a vehicle lamp having a thin and light resin cover without deteriorating its appearance.

According to an illustrative aspect of the present invention, a vehicle lamp includes a lamp body having an opening, a resin cover attached to the opening to form a lamp chamber together with the lamp body; and a light source disposed inside the lamp chamber to irradiate light through the resin cover. The resin cover includes a design surface portion, and a peripheral edge portion surrounding the design surface portion. The peripheral edge portion includes a gate mark, and a thick-walled portion having a greater wall thickness than the other part of the peripheral edge portion and extending from the gate mark toward the design surface portion.

Other aspects and advantages of the invention will be apparent from the following description, the drawings and the claims.

DETAILED DESCRIPTION

Hereinafter, an exemplary embodiment of the present invention will be described in detail with reference to the drawings. However, the following exemplary embodiment does not limit the scope of the claimed invention, and all combinations of features of the exemplary embodiment are not necessarily required to address the problem described above.

Figure 1:
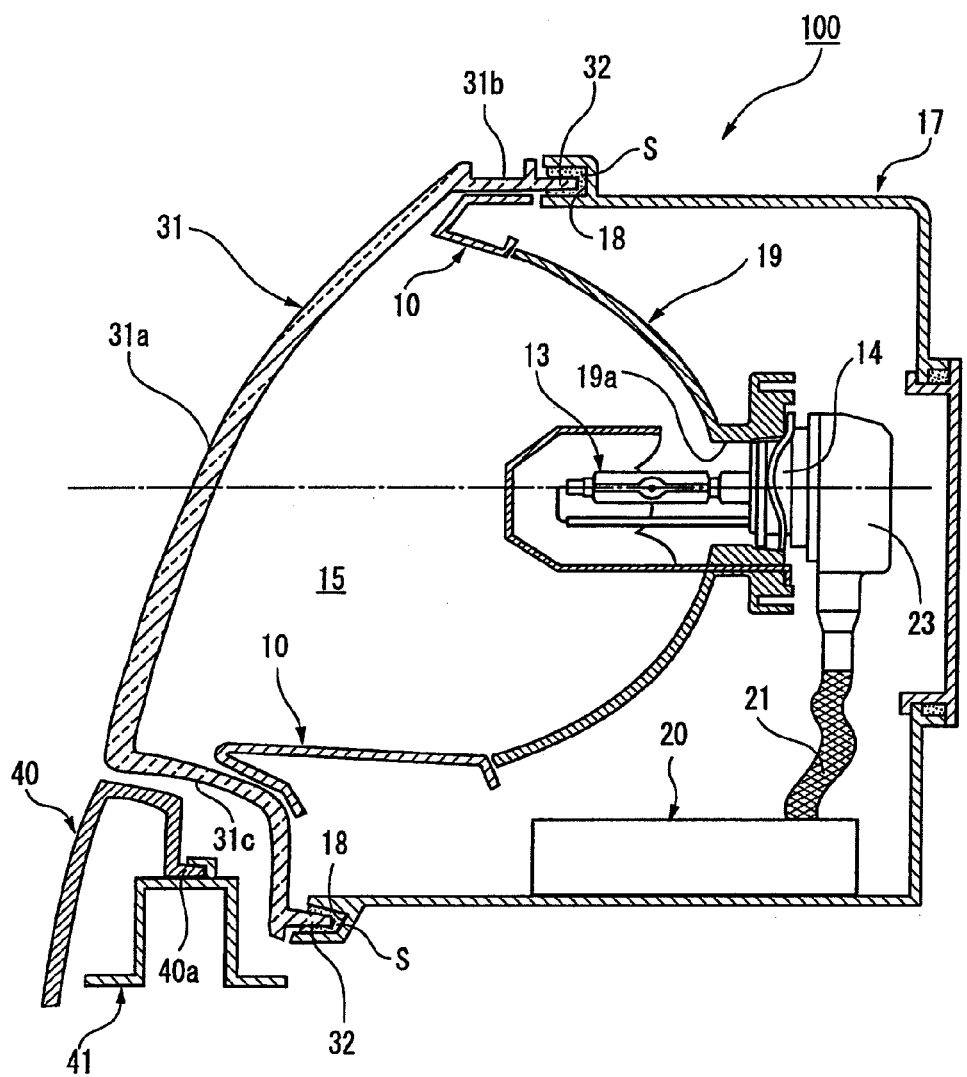
FIG. 1 is a vertical sectional view of a vehicle lamp according to an exemplary embodiment of the present invention.

As shown in FIG. 1, a vehicle lamp 100 according to the exemplary embodiment includes a lamp body 17 having a front opening and a transparent resin cover 31 attached to the front opening. The lamp body 17 and the resin cover 31 form a lamp chamber 15. The vehicle lamp 100 further includes, inside the lamp chamber 15, a discharge bulb 13 serving as a light source, a reflector 19 which is disposed so as to be tiltable via an aiming mechanism. The reflector 19 is configured to forwardly (toward the left in FIG. 1) reflect light emitted from the discharge bulb 13. The vehicle lamp 100 according to the exemplary embodiment is configured as a right headlamp that is mounted on a front right corner of a vehicle.

An extension 10 is disposed between the lamp body 17 and the resin cover 31 to cover a gap between a peripheral edge of the opening of the lamp body 17 and a peripheral edge of an opening of the reflector.

A discharge bulb 13 is detachably attached to a bulb mounting hole 19a that is formed at a rear central portion of the reflector 19. Further, a connector 23, which is connected to a high-voltage cord 21 led from a lighting circuit 20, is fitted to a plug 14 of the discharge bulb 13.

While the discharge bulb 13 is used as a light source in this exemplary embodiment, the light source may be an incandescent bulb or a semiconductor light emitting device such as an LED. Further, the vehicle lamp 100 may further include a projection lens, a shade, and the like that are arranged in front of the light source to provide a projector-type lamp unit.

The lamp body 17 is integrally molded with a synthetic resin material. For example, a polypropylene (PP) resin, a polycarbonate (PC) resin, a polycarbonate ABS (PC-ABS) resin, or the like may preferably be used as the synthetic resin material.

A portion of the lamp body 17 defining the lamp chamber 15 is formed to be recessed, so that an accommodating space is provided along a side surface of the vehicle toward the rear. A seal groove 18 is formed on the peripheral edge of the opening of the lamp body 17. The seal groove 18 is opened toward the front of the vehicle. A seal protrusion 32 is formed on a peripheral edge portion 31b of the resin cover 31. The seal protrusion 32 is fitted into the seal groove 18.

The resin cover 31 is molded with, for example, a transparent synthetic resin material, such as a polycarbonate resin, a polycarbonate ABS resin, an acrylic (PMMA) resin, a high-heat polycarbonate resin, a polyetherimide (PEI) resin, a polyethersulfone (PES) resin, or the like. The resin cover 31 includes a design surface portion 31a and the peripheral edge portion 31b surrounding the design surface portion 31a. The design surface portion 31a is a portion of the resin cover 31 that affects the outer appearance of the vehicle lamp 100 when the vehicle lamp 100 is mounted on the vehicle. In other words, the design surface portion 31a is exposed to the outside of the vehicle when the vehicle lamp 100 is mounted on the vehicle. As shown in FIG. 1, the seal protrusion 32 design surface portion is inserted into the seal groove 18 of the lamp body 17 and the seal groove 18 is filled with an adhesive S, whereby the resin cover 21 covers substantially the entire front opening of the lamp body 17.

Figure 2:
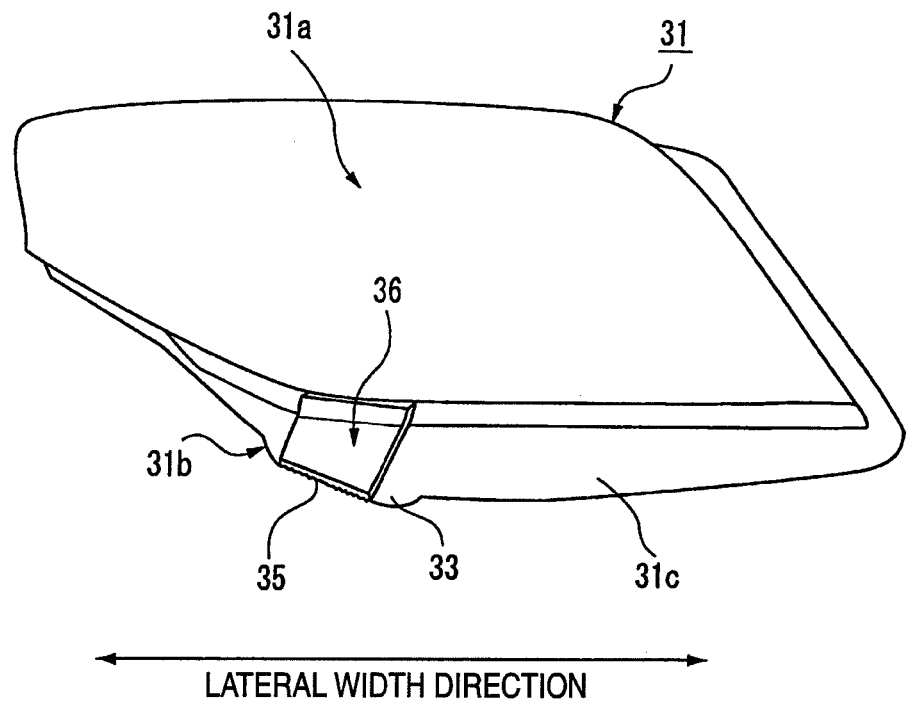
FIG. 2 is an overall perspective view of a resin cover shown in FIG. 1.

Furthermore, as shown in FIG. 2, a gate flange 33 is formed so as to protrude from the peripheral edge portion 31b of the resin cover 31. The gate flange 33 has a linear gate mark 35 along an edge of the fate flange 33. When the vehicle lamp 100 is mounted on the vehicle, the gate flange 33 is oriented so as to protrude from a curved portion located substantially in the middle of a lower wall 31c of the resin cover 31 in a lateral width direction.

Further, a thick-walled portion 36 is formed on the outer surface of the peripheral edge portion 31b where the gate flange 33 is formed. The thick-walled portion 36 has a rectangular cross-section, and extends from the gate mark 35 toward the design surface portion 31a with a width W that is equal to or larger than the width of the gate mark 35. However, as long as the pressure loss of the injection pressure at the thick portion is reduced, the width W of the thick-walled portion 36 may be smaller than the width of the gate mark 35. The thick-walled portion 36 is configured to have a wall thickness T and a length L from the gate mark 35 toward the design surface portion 31a (see FIG. 5). The wall thickness T is equal to or larger than 1.2 times the average wall thickness t3 of the peripheral edge portion 31b, and the length L is equal to or larger than 20 mm.

As shown in FIG. 1, a front bumper cover 40 is disposed directly below the vehicle lamp 100 with a slight gap between the lower wall 31c of the resin cover 31 and the front bumper cover 40 such that a flange 40a formed on an edge portion on a rear side of the front bumper cover 40 is held by a reinforcement 41.

When the vehicle lamp 100 is mounted on the vehicle, a lower portion of the vehicle lamp 100 is covered with the front bumper cover 40, which is a part of the vehicle body. Accordingly, when the vehicle lamp 100 is viewed from the front of the vehicle, the gate flange 33 or the thick-walled portion 36 does not affect the design from the front. Therefore, when the vehicle lamp 100 is mounted on the vehicle, the appearance of the vehicle lamp 100 is not deteriorated.

Figure 3:
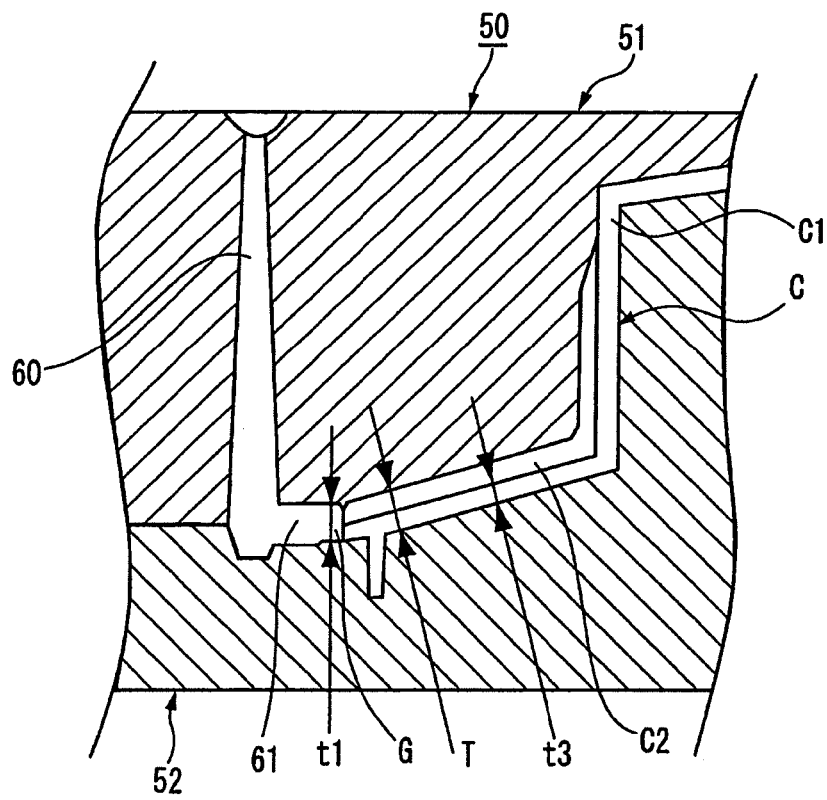
FIG. 3 is a sectional view of an injection mold that is used to mold the resin cover.
Figure 4:
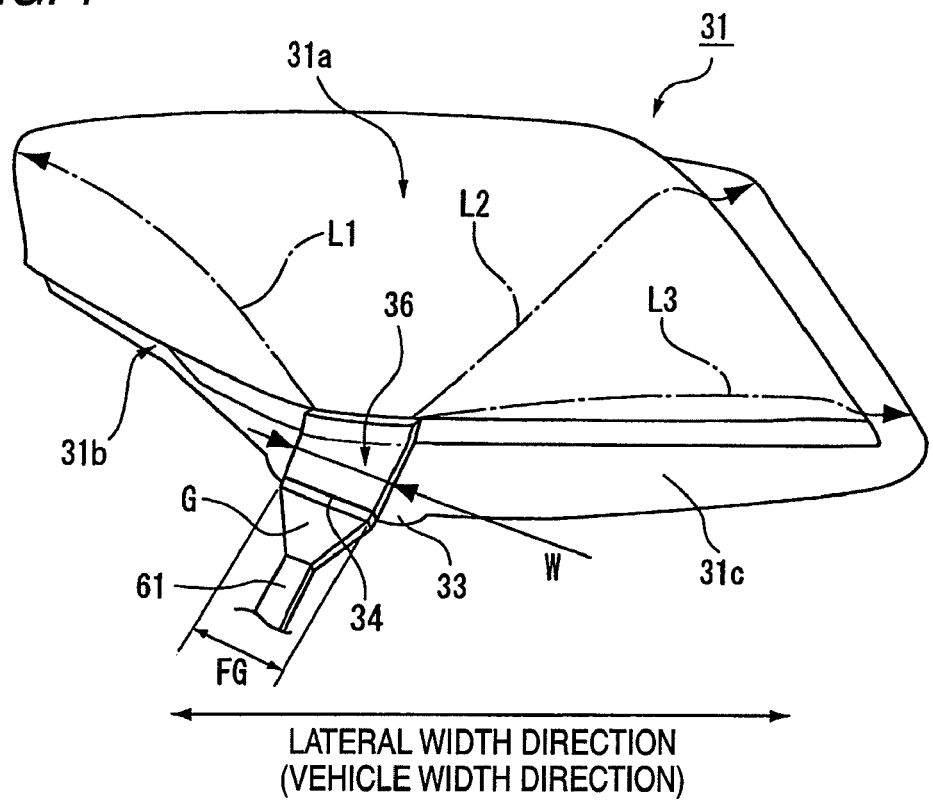
FIG. 4 is a schematic view illustrating a flow length of molten resin in a cavity of the injection mold.
Figure 5:
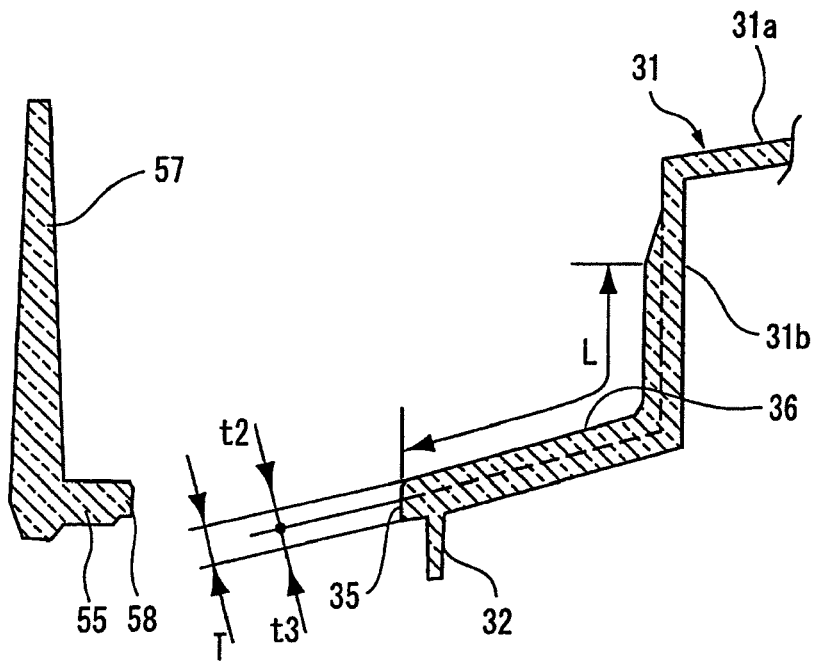
FIG. 5 is a sectional view of main parts of a product which is taken out from the injection mold and having a gate cut off.

FIG. 3 is a sectional view of an injection mold 50 that is used to mold the resin cover 31, FIG. 4 is a schematic view a flow length of a molten resin in a cavity C of the injection mold 50, and FIG. 5 is a sectional view of a product which is taken out from the injection mold and having a gate cut off.

As shown in FIG. 3, the injection mold 50 includes a stationary mold 51 which is fixed to an injection molding machine, and a movable mold 52 which is driven to open the mold. The cavity C is formed between mold parting surfaces (parting lines) between the stationary mold 51 and the movable mold 52 to mold the resin cover 31.

The cavity C has a first cavity C1 and a second cavity C2. The second cavity C2 is configured to form the thick-walled portion 36 of the peripheral edge portion 31b. The first cavity C1 is configured to form the design surface portion 31a and other portion of the peripheral edge portion 31b of the resin cover 31. In the first cavity C1, a gap between the stationary mold 51 and the movable mold 52 is substantially uniform, as each of the design surface portion 31a and the peripheral edge portion 31b are configured to have a substantially uniform wall thickness. In the second cavity C2, a gap between the stationary mold 51 and the movable mold 52 is partially increased, and is greater than the gap in the first cavity C1.

The cavity C is filled with a molten resin (e.g., PC resin) through a sprue 60 and a runner 61 that are connected to a nozzle of the injection molding machine, and a fan gate G is provided at the joint between the cavity C and the runner 61.

As shown in FIGS. 3 and 4, the fan gate G forms substantially an isosceles triangle, communicates with the runner 61 at an apex thereof, and is opened to the cavity C having the shape corresponding to the resin cover 31 at the bottom thereof.

The molten resin, which is injected from the nozzle of the injection molding machine, flows into the fan gate G through the sprue 60 and the runner 61, and is injected into the cavity C through the fan gate G. Subsequently, the molten resin is cooled and solidified in the mold. As a result, the resin cover 31 having the shape corresponding to the cavity C is obtained.

According to the vehicle lamp 100 having the configuration described above, it is possible to integrally mold the resin cover 31 by injecting the molten resin into the cavity C through the second cavity C2 where the thick-walled portion 36 is formed. Accordingly, when the molten resin is injected into the cavity C from the fan gate G in the injection mold 50, a large amount of the molten resin flows into the second cavity C2 prior to the first cavity C1.

Accordingly, a flow length of the molten resin in the injection mold 50, in which the second cavity C2 for forming the thick-walled portion 36 functions as a runner of the molten resin as described above, can be made longer compared to a mold adapted to mold a resin cover without the thick-walled portion 36. Accordingly, it is possible to make the molten resin easily run into every corner of the cavity C. Therefore, it is possible to mold the thin resin cover 31 with small injection pressure loss.

Further, the thick-walled portion 36 is formed on the peripheral edge portion 31b that surrounds the design surface portion 31a of the resin cover 31. In particular, the thick-walled portion 36 of is formed on the lower wall 31c of the resin cover 31 that is covered by the front bumper cover 40 when the vehicle lamp 100 is mounted on the vehicle. Therefore, it is possible to easily conceal the thick-walled portion 36 by the bumper cover 40 that forms a part of the vehicle body, thereby preventing the appearance from deteriorating when the vehicle lamp 100 is mounted on the vehicle.

Therefore, it is possible to provide the vehicle lamp 100 having a thin and light resin cover 31 without the deteriorating the appearance of the vehicle lamp 100.

Further, the wall thickness of a molding can be made thinner as it becomes distant from the fan gate G. Therefore, as shown in FIG. 1, the resin cover 31 may be configured such that the wall thickness of the resin cover 31 gradually decreases from the lower side of the resin cover 31 toward the upper side of the resin cover 31. As a result, the upper portion of the design surface portion 31a of the resin cover 31 can be made to easily deform, so that it is possible to improve pedestrian protection performance of the vehicle lamp 100. Further, by making the wall thickness of the resin cover 31 to gradually decrease from the lower side of the resin cover 31 toward the upper side of the resin cover 31, it is also be possible to reduce a glare resulting from the light irradiation from the vehicle lamp 100.

According to the exemplary embodiment, a gate width FG of the fan gate G is 40 mm or more and a gate thickness t1 of the fan gate G is 4 mm or less so as to be suitable for the resin cover 31. The dimension of the fan gate G is optionally set depending on the size of a resin cover to be formed. If a resin cover to be formed is smaller than the resin cover 31, a fan gate having a smaller dimension than the fan gate G is used.

Further, the fan gate G of this embodiment is arranged at the end of the cavity C, which has the shape corresponding to the flange portion 33 formed on the peripheral edge portion 31b of the resin cover 31 to be formed.

Although the gate position of the fan gate G is at the curved portion of the peripheral edge portion 31b of the resin cover 31 as shown in FIG. 4, the fan gate G can be arranged at the cavity C of the mold through the flange portion 33 formed at the peripheral edge portion 31b. That is, a gate treatment surface 34 of the gate flange 33 can be formed straight even at the curved portion of the peripheral edge portion 31b.

As a result, as shown in FIG. 5, when cutting off a resin 58 solidified in the fan gate G, a resin 55 solidified in the runner 61, and a resin 57 solidified in the sprue 60 from the flange portion 33 of the resin cover (molding) 31 that is taken out from the injection mold 50, it is possible to cut the gate treatment surface 34 straight even at the curved portion of the peripheral edge portion 31b. Thus, when cutting the resin with a cutting method using waterjet or a laser beam, or with an in-mold gate cut method, it is possible to improve cutting accuracy.

In order to ensure the cutting accuracy for linearly cutting the curved portion of the resin cover 31, it is preferable that the protruding dimension of the gate flange 33 be 1 mm or more.

As shown in FIG. 4, regardless of the shape of the peripheral edge portion 31b, the fan gate G may be arranged in the substantially middle position on the resin cover 31 in the lateral width direction where the flow lengths (distances from the fan gate G to the flow ends on the left, right, and middle) L1, L2, L3 of the molten resin becomes the shortest, whereby it is possible to mold the thin resin cover 31 with small injection pressure loss.

Accordingly, it is possible to provide a vehicle lamp 100 having the thin and light resin cover 31 even if the shape may be irregular.

Meanwhile, configurations of the lamp body, the light source, the thick-walled portion, and the like of the vehicle lamp according to the present invention are not limited to the configurations of the exemplary embodiment described above.

The invention will be described in more detail below with reference to examples. However, the invention is not limited to the examples.

Figure 6:
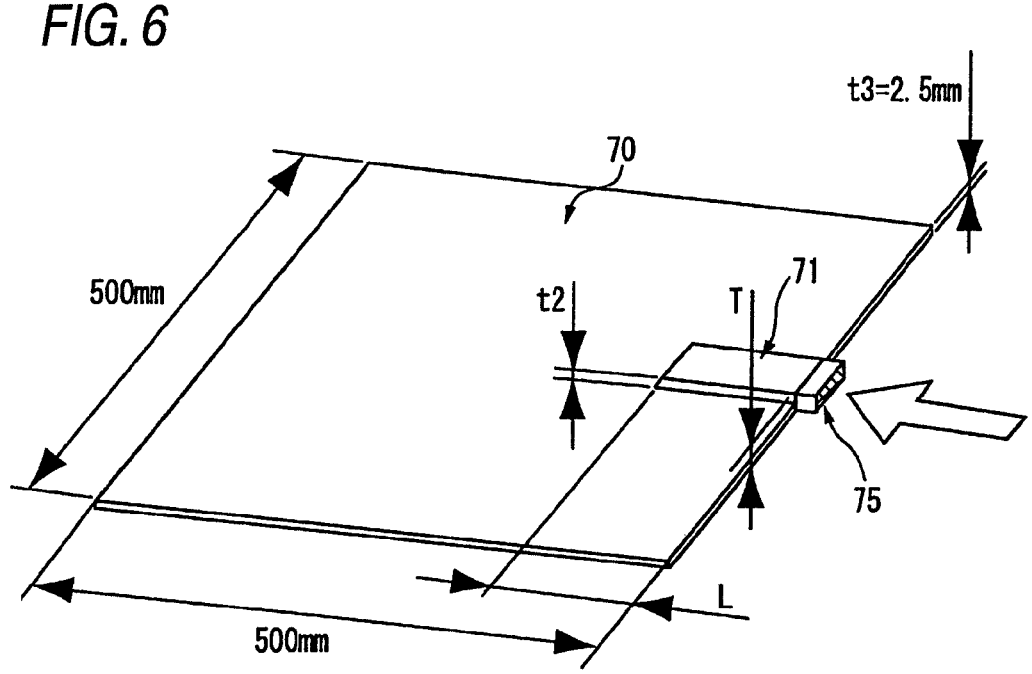
FIG. 6 is a diagram illustrating a shape of a product example that is used to examine a relationship between injection pressure loss when injection molding the product and a thick-walled portion.

The CAE analysis was carried out with respect to a product 70 of a flat plate shape shown in FIG. 6 to examine a relationship between a thick-walled portion and the injection pressure loss during injection molding of the product.

Molding Conditions

Resin material: PC resin

Molten Resin Temperature: 300° C.

Mold Temperature: 80° C.

Injection Rate: 125 cc/sec

Fan Gate: Gate Width (FG) of 40 mm, Gate Thickness (t1) of 4 mm

Product Configuration

Rectangular Flat Plate Shape of 500 mm Length×500 mm Width×2.5 mm Wall Thickness (t3)

The injection pressure loss was calculated with the lengths L of thick-walled portions 71 having a width of 20 mm being 10 mm, 20 mm, 40 mm, and 60 mm, and the thicknesses t2 of the respective thick-walled portions 71 being 0.5 mm, 1.0 mm, 1.5 mm, 2.0 mm, 2.5 mm, and 3.0 mm. Pressure loss was 150 MPa when the thick-walled portion 71 was not provided. The calculation results are shown in FIG. 7.

Figure 7:
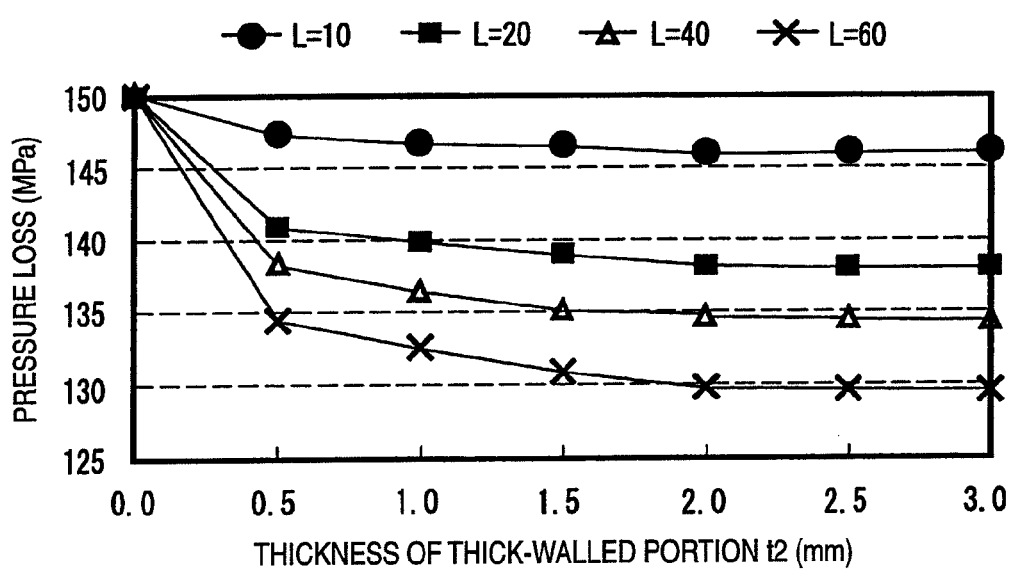
FIG. 7 is a graph showing a correlation between the injection pressure loss and the thick-walled portion.

As shown in FIG. 7, when the length L of the thick-walled portion 71 is 20 mm or more, the injection pressure loss is significantly decreased. Further, also when the wall thickness of the thick-walled portion 71 (T=wall thickness t3 of product 70+additional thickness t2 of thick-walled portion 71) is equal to or larger than 1.2 times the wall thickness t3 of the product 70, the injection pressure loss is significantly decreased. However, making the thickness T of the thick-walled portion 71 equal to or larger than the gate thickness t1 does not have much effect in further decreasing the pressure loss. Further, it is possible to reduce the injection pressure loss by as much as the length L of the thick-walled portion is increased.

While the present invention has been described with reference to a certain exemplary embodiment thereof, the scope of the present invention in not limited to the exemplary embodiment described above, and it will be understood by those skilled in the art that various changes and modifications may be made therein.

What is claimed is:

1. A vehicle lamp comprising:

a lamp body having an opening;

a resin cover attached to the opening to form a lamp chamber together with the lamp body; and a light source disposed inside the lamp chamber to irradiate light through the resin cover, wherein the resin cover comprises:

a design surface portion; and a peripheral edge portion surrounding the design surface portion, and wherein the peripheral edge portion comprises:

a gate mark; and a thick-walled portion having a greater wall thickness than the other part of the peripheral edge portion and extending from the gate mark toward the design surface portion.

2. The vehicle lamp as set forth in claim 1, wherein the wall thickness of the thick-walled portion is equal to or larger than 1.2 times an average wall thickness of the other part of the peripheral edge portion.

3. The vehicle lamp as set forth in claim 1, wherein the thick-walled portion has a length of 20 mm or more from the gate mark.

4. The vehicle lamp as set forth in claim 1, wherein the gate mark is formed at a position where a flow length of a molten resin during molding becomes the shortest.

5. The vehicle lamp as set forth in claim 1, wherein the thick-walled portion is provided below the design surface portion.

6. The vehicle lamp as set forth in claim 1, wherein the thick-walled portion has a rectangular cross section.

7. The vehicle lamp as set forth in claim 1, wherein the peripheral edge portion further comprises a gate flange on which the gate mark and the thick-walled portion are formed, wherein the gate mark has a linear shape.

8. An injection mold configured to form a resin cover of a vehicle lamp, the vehicle lamp comprising:

a lamp body having an opening to which the resin cover is attached to form a lamp chamber together with the lamp body; and a light source disposed inside the lamp chamber to irradiate light through the resin cover, wherein the resin cover comprises:

a design surface portion; and a peripheral edge portion surrounding the design surface portion, and wherein the peripheral edge portion comprises:

a gate mark; and a thick-walled portion having a greater wall thickness than the other part of the peripheral edge portion and extending from the gate mark toward the design surface portion, the injection mold comprising a stationary mold and a movable mold, wherein the stationary mold and the movable mold are configured and arranged such that a cavity between the stationary mold and the movable mold comprises a first cavity in which the design surface portion and the other part of the peripheral edge portion is formed, and a second cavity in which the thick-walled portion is formed.

* * * * *